United States Patent
Werner et al.

(10) Patent No.: US 6,493,381 B1
(45) Date of Patent: *Dec. 10, 2002

(54) BLIND EQUALIZATION ALGORITHM WITH THE JOINT USE OF THE CONSTANT R AND THE SLICED SYMBOLS

(75) Inventors: Jean-Jacques Werner, Holmdel, NJ (US); Jian Yang, Marlboro, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/339,793

(22) Filed: Jun. 24, 1999

(51) Int. Cl.[7] .............................. H03H 7/30; H03H 7/40; H03K 5/159
(52) U.S. Cl. ........................ 375/232; 375/230; 375/233
(58) Field of Search ................................. 375/232, 230, 375/233

(56) References Cited

U.S. PATENT DOCUMENTS

| | | | | |
|---|---|---|---|---|
| 4,227,152 A | * | 10/1980 | Godard et al. | 375/231 |
| 5,263,033 A | * | 11/1993 | Seshadri | 714/792 |
| 5,506,871 A | * | 4/1996 | Hwang et al. | 375/230 |
| 5,646,957 A | * | 7/1997 | Im et al. | 375/233 |
| 5,909,466 A | * | 6/1999 | Labat et al. | 375/233 |
| 5,970,093 A | * | 10/1999 | De Lantremange | 375/234 |
| 6,285,881 B1 | * | 9/2001 | Huang | 455/434 |
| 6,314,134 B1 | * | 11/2001 | Wener et al. | 375/232 |

* cited by examiner

Primary Examiner—Chi Pham
Assistant Examiner—Tony Al-Beshrawi
(74) Attorney, Agent, or Firm—Steve Mendelsohn

(57) ABSTRACT

A receiver, comprising an adaptive filter, performs blind equalization using a modified form of the constant modulus algorithm (CMA). This modified form of CMA is referred to as symbol CMA (SCMA). SCMA utilizes both the constant R and the sliced symbols, $\hat{A}_n$, in performing blind equalization. The constant R is statistically created to the sliced symbols, $\hat{A}_n$. The adaptive filter is a two-filter structure. The SCMA blind equalization technique reduces the rate of occurrence of a diagonal solution.

34 Claims, 3 Drawing Sheets

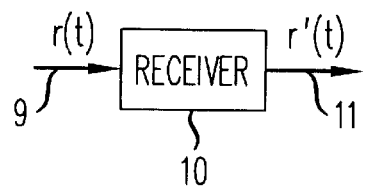
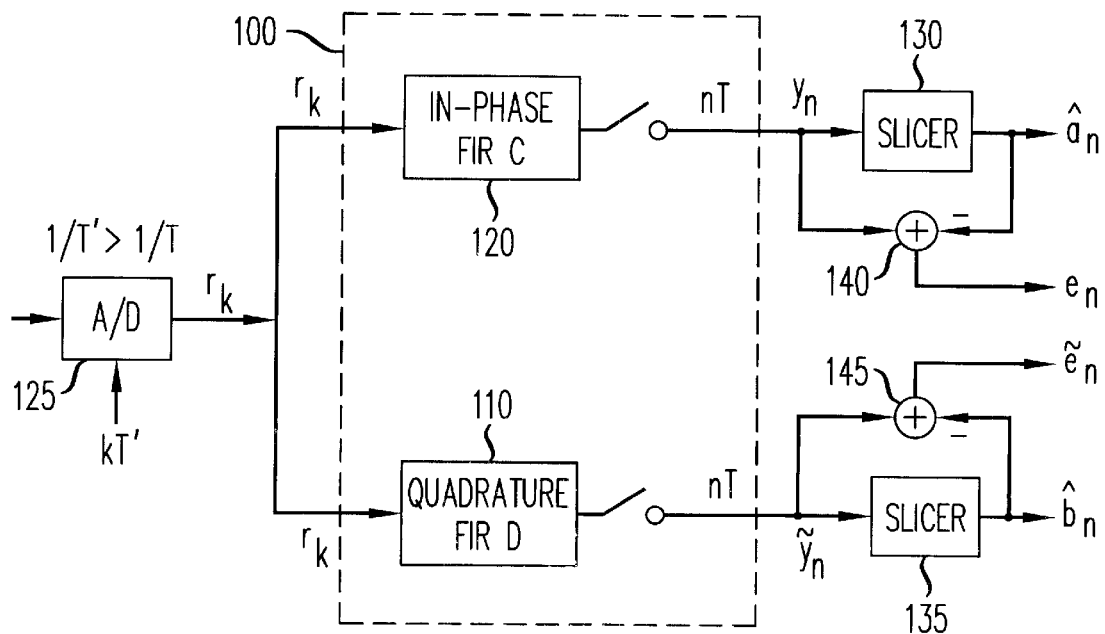

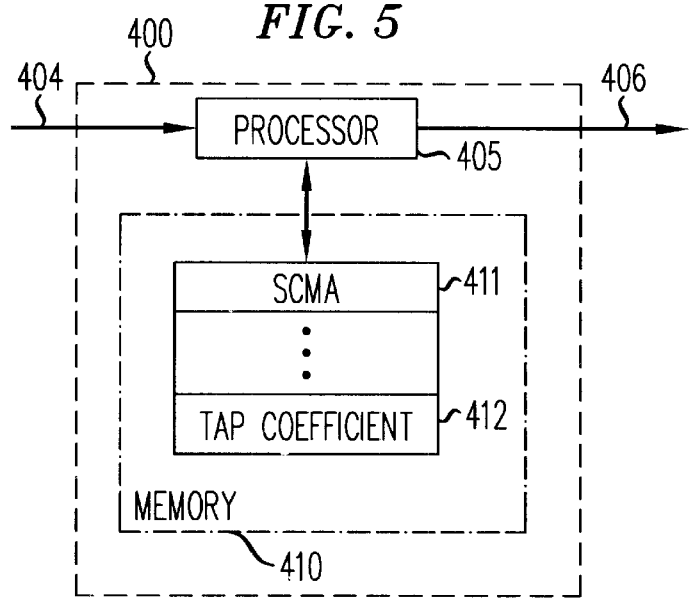
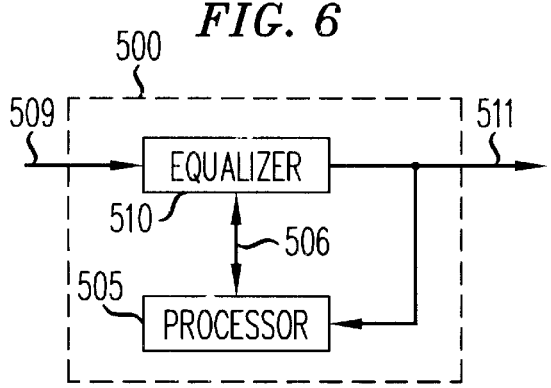
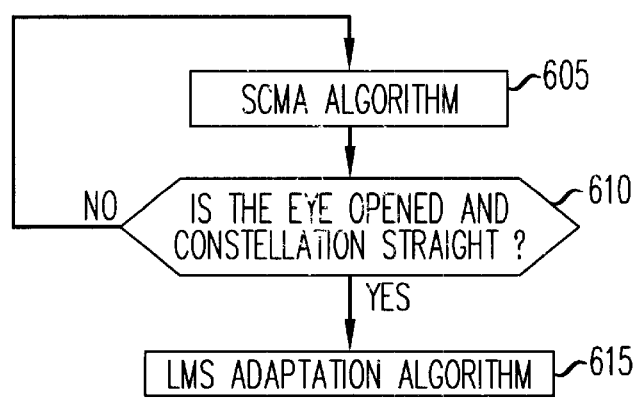

US 6,493,381 B1

BLIND EQUALIZATION ALGORITHM WITH THE JOINT USE OF THE CONSTANT R AND THE SLICED SYMBOLS

CROSS-REFERENCE TO RELATED APPLICATIONS

Related subject matter is disclosed in the commonly assigned, co-pending, U.S. Patent application of Werner et al., entitled "Blind Equalization Algorithm with Joint Use of the Constant Modulus Algorithm and the MultiModulus Algorithm" Ser. No. 09/066189, filed on Apr. 24, 1998.

FIELD OF THE INVENTION

The present invention relates to communications equipment, and, more particularly, to blind equalization in a receiver.

BACKGROUND OF THE INVENTION

In blind equalization, the adaptive filters of a receiver are converged without the use of a training signal. As known in the art, there are two techniques for blind equalization: one is referred to herein as the "reduced constellation algorithrm" (RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, U.S. Pat. No. 5,793,807, issued Aug. 11, 1998 to Werner et al., and entitled "blind Equalization," presents a new blind equalization technique—the multimodulus algorithm (MMA)—as an alternative to the above-mentioned RCA and CMA approaches.

However, for all blind equalization approaches the most fundamental performance issue is the ability to achieve reliable initial convergence—else the adaptive filter may converge to a wrong solution such as the well-known "diagonal solution."

Generally speaking, the RCA algorithm has less reliable convergence than either the CMA or MMA algorithms. As between the CMA and MMA algorithms, these algorithms have both benefits and drawbacks. For example, the CMA algorithm provides more reliable convergence—thus avoiding incorrect diagonal solutions—but the CMA algorithm requires an expensive rotator. In comparison, the MMA algorithm does not require an expensive rotator but is more susceptible than the CMA algorithm to incorrect convergence.

However, there are some alternatives for reducing the occurrence of diagonal solutions. U.S. Pat. No. 5,835,731, issued Nov. 10, 1998 to Werner et al., presents a blind equalization algorithm referred to as the constrained Hilbert cost function (CHCF). The CHCF algorithm uses the Hilbert transfer function and dot-product properties of the in-phase and quadrature filters to prevent the occurrence of diagonal solutions. U.S. Pat. No. 5,809,074, issued Sep. 15, 1998 to Werner et al., presents a blind equalization technique referred to as the transition algorithm. In the latter, generally speaking, an adaptive filter first uses the CMA algorithm and then switches to using the MMA algorithm. Finally, the co-pending U.S. Patent application of Werner et al., entitled "Blind Equalization Algorithm with Joint Use of the Constant Modulus Algorithm and the MultiModulus Algorithm" Ser. No. 09/066189, filed on Apr. 24, 1998, presents a method for performing blind equalization using a joint CMA-MMA blind equalization algorithm.

SUMMARY OF THE INVENTION

We have discovered another technique for use in blind equalization of an adaptive equalizer that reduces the rate of occurrence of a diagonal solution. In particular, and in accordance with the invention, a receiver performs blind equalization as a function of both the constant R and the sliced symbols $\hat{A}_n$.

In an embodiment of the invention, a receiver comprises an adaptive filter having a two-filter structure. The receiver uses a modified form of the CMA algorithm to perform blind equalization. This modified form of CMA is referred to herein as symbol CMA (SCMA). SCMA uses both the constant R and the sliced symbols, $\hat{A}_n$, in performing blind equalization. Advantageously, SCMA can rotate a constellation, whereas CMA cannot.

BRIEF DESCRIPTION OF THE DRAWINGS

FIG. 1 is an illustrative block diagram of a portion of a communications system embodying the principles of the invention;

FIG. 2 is an illustrative block diagram of a prior art phase-splitting equalizer;

FIGS. 5 and 6 are illustrative block diagrams of a portion of a receiver embodying the principles of the invention; and FIG. 7 shows an illustrative blind start-up procedure in accordance with the principles of the invention.

DETAILED DESCRIPTION

Other than the inventive concept, the elements described below and shown in the FIGS. are well-known and will not be described in detail. Also, as used herein, an adaptive filter is, e.g., a fractionally spaced linear equalizer, which is hereafter simply referred to as an FSLE equalizer or, simply, an equalizer.

An illustrative high-level block diagram of a portion of a communications system embodying the principles of the invention is shown in FIG. 1. For illustrative purposes only, it is assumed that receiver 10 receives a CAP (carrierless, amplitude modulation, phase modulation) signal, which can be represented by:

$$r(t) = \sum_n [a_n p(t - nT) - b_n \tilde{p}(t - nT)] + \xi(t) \qquad (1)$$

where $a_n$ and $b_n$ are discrete-valued multilevel symbols, p(t) and $\tilde{p}(t)$ are impulse responses which form a Hilbert pair, T is the symbol period, and $\xi(t)$ is additive noise introduced in the channel. (Additional information on a CAP communications system can be found in J. J. Werner, "Tutorial on Carrierless AM/PM—Part I—Fundamentals and Digital CAP Transmitter," Contribution to ANSI X3T9.5 TP/PMD Working Group, Minneapolis, Jun. 23, 1992.)

It is assumed that the CAP signal in equation (1) has been distorted while propagating through communications channel 9 and experiences intersymbol interference (ISI). This ISI consists of intrachannel ISI ($a_n$ or $b_n$ symbols interfering with each other) and interchannel ISI ($a_n$ and $b_n$ symbols interfering with each other). The purpose of receiver 10 is to remove the ISI and minimize the effect of the additive noise $\xi(t)$ to provide signal r'(t). The inventive concept is illustratively described in the context of a symbol CMA (SCMA) blind equalization algorithm for use within receiver 10.

At this point, before describing the inventive concept, a brief review is provided of adaptive filters and some blind equalization algorithms. If reader is familiar with this background, simply skip-ahead to the section entitled "Symbol CMA."

Adaptive Filters, and Blind Equalization

Figure 3:
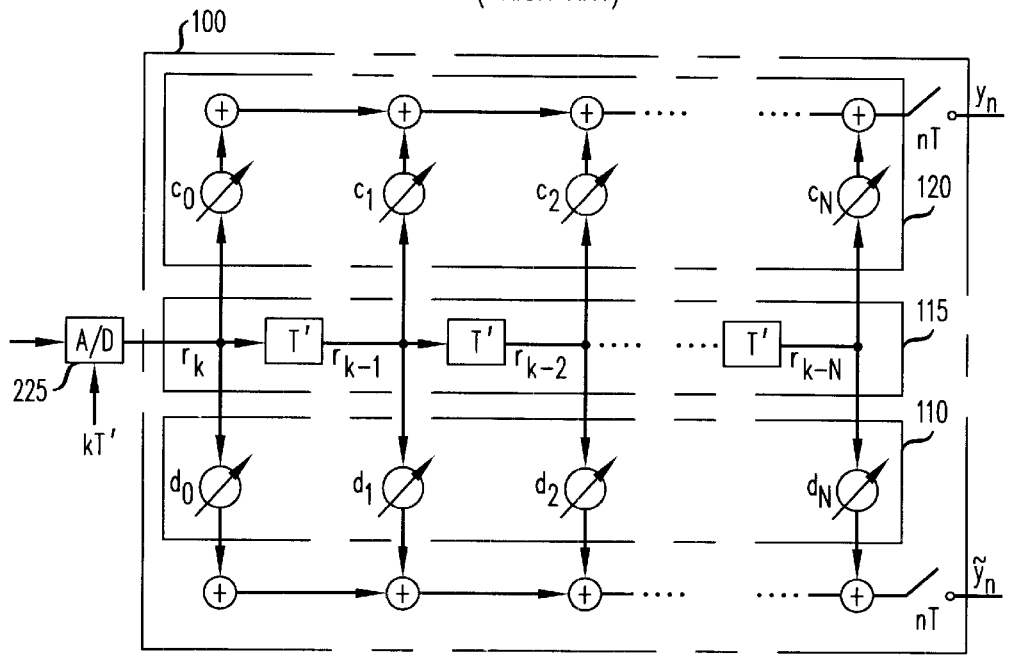
FIG. 3 is an illustrative block diagram of a portion of a prior art adaptive filter for use in an equalizer.

An illustrative phase-splitting FSLE equalizer 100 is shown in FIG. 2. It is assumed that FSLE equalizer 100 operates on an input signal that can be characterized as having N dimensions. In this example, N=2, i.e., the input signal comprises two component dimensions: an in-phase component and a quadrature component. (It should also be noted that the term "channel" may also be used to refer to each dimension, e.g., the in-phase dimension is also referred to as the in-phase channel.) FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 3. The two FIR filters 110 and 120 share the same tapped delay line 115, which stores sequences of successive Analog-to-Digital Converter (A/D) 125 samples $r_k$. The sampling rate 1/T' of A/D 125 is typically three to four times higher than the symbol rate 1/T and is chosen in such a way that it satisfies the sampling theorem for real signals. It is assumed that T/T'=i, where i is an integer.

The output signals of the two adaptive FIR filters 110 and 120 as shown in FIG. 3 are computed at the symbol rate 1/T. The equalizer taps and input samples can be represented by a corresponding N-dimensional vector. As such, the following relationships are now defined:

$$r_n^T = [r_k, r_{k-1}, \ldots, r_{k-N}] = \text{vector of A/D samples in delay line;} \quad (2)$$

$$c_n^T = [c_0, c_1, c_2, \ldots, c_N] = \text{vector of in-phase tap coefficients; and} \quad (3)$$

$$d_n^T = [d_0, d_1, d_2, \ldots, d_N] = \text{vector of quadrature phase tap coefficients;} \quad (4)$$

where the superscript T denotes vector transpose, the subscript n refers to the symbol period nT, and k=(i)(n).

Let $y_n$ and $\tilde{y}_n$ be the computed output signals of the in-phase and quadrature filters, respectively, and:

$$y_n = c_n^T r_n; \text{ and} \quad (5)$$

$$\tilde{y}_n = d_n^T r_n. \quad (6)$$

An X/Y display of the output signals $y_n$ and $\tilde{y}_n$ or, equivalently, of the complex output signal $Y_n = y_n + j\tilde{y}_n$, is called a signal constellation. After convergence, ideally the signal constellation consists of a display of the complex symbols $A_n = a_n + jb_n$ corrupted by some small noise and ISI.

Referring back to FIG. 2, FSLE equalizer 100 can be characterized as having two modes of operation, a normal mode (steady state) and a start-up mode (non-steady state).

In the normal mode of operation, the decision devices, i.e., slicers 130 and 135, compare the equalizer complex output samples, $Y_n$, (where $Y_n = y_n + j\tilde{y}_n$), with all the possible transmitted complex symbols, $A_n$ (where $A_n = a_n + jb_n$), and select the symbol $\hat{A}_n$ which is the closest to $Y_n$. The receiver then computes an error, $E_n$, where:

$$E_n = Y_n - \hat{A}_n, \quad (7)$$

which is used to update the tap coefficients of equalizer 100. The most common tap updating algorithm is the LMS algorithm, which is a stochastic gradient algorithm that minimizes the mean square error (MSE), which is defined as:

$$MSE \triangleq E[|E_n|^2] = E[|Y_n - \hat{A}_n|^2] = E[e_n^2] + E[\tilde{e}_n^2]. \quad (8)$$

In equation (8), E[.] denotes expectation and $e_n$ and $\tilde{e}_n$ are the following in-phase and quadrature errors:

$$e_n = y_n - \hat{a}_n, \text{ and} \quad (9)$$

$$\tilde{e}_n = \tilde{y}_n - \hat{b}_n. \quad (10)$$

The tap coefficients of the two adaptive filters are updated using the above-mentioned least-mean-square (LMS) algorithm, i.e., $$c_{n+1} = c_n - \alpha e_n r_n, \text{ and} \quad (11)$$

$$d_{n+1} = d_n - \alpha \tilde{e}_n r_n, \quad (12)$$

where $\alpha$ is the step size used in the tap adjustment algorithm.

In contrast to the steady state mode of operation, the start-up mode is used to converge the tap coefficient values to an initial set of values. In some systems a training sequence is used during start-up (i.e., a predefined sequence of $A_n$ symbols), from which the receiver can compute meaningful errors $E_n$ by using the equalizer output signal $Y_n$ and the known sequence of transmitted symbols $A_n$. In this case, tap adaptation is said to be done with respect to an "ideal reference."

However, when no training sequence is available, equalizer 100 has to be converged blindly. This usually comprises two main steps. First, a blind equalization algorithm is used to open the "eye diagram," i.e., achieve initial convergence. Then, once the eye is open enough, the receiver switches to, e.g., the above-described LMS tap adaptation algorithm to obtain final steady-state convergence. The switch between the two kinds of algorithms are controlled by so called schedule-driven or event-driven counters (e.g., see the above-mentioned U.S. Pat. No. 5,809,074 issued to Werner et al.). The philosophy of blind equalization is to use a tap adaptation algorithm that minimizes a cost function that is better suited to provide initial convergence of equalizer 100 than the MSE represented by equation (8).

The cost functions used for blind equalization algorithms and the LMS algorithm minimizes different quantities. As see in equation (8), the cost function of the LMS algorithm is given as:

$$CF = E[|Y_n - \hat{A}_n|^2]. \quad (13)$$

In equation (13), the LMS algorithm uses the sliced symbols, $\hat{A}_n$, to achieve convergence. However, with a blind start-up, due to the severe corruption of data, the cost functions used for blind equalization algorithms need to use a constant R, which is statistically related to the sliced symbols $\hat{A}_n$. For instance, the cost function of CMA is $$CF = E[(|Y_n|^2 - R^2)^2]. \quad (14)$$

Similarly, for the blind equalization algorithm MMA, the cost functions may be given as:

$$CF_i = E[(y_n^2 - R^2)^2]; \text{ and} \quad (15)$$

$$CF_q = E[(\tilde{y}_n^2 - R^2)^2]. \quad (16)$$

As can be observed, the common feature in the cost functions for CMA and MMA is the usage of the constant R as a reference. (Illustrative techniques for the computation of R can be found in, e.g., U.S. Pat. No. 5,793,807, issued Aug. 11, 1998 to Werner et al., entitled "Multimodulus blind equalization using piecewise linear contours.")

Symbol CMA (SCMA)

As noted earlier, when blind equalization is used with an adaptive filter, e.g., a phase-splitting equalizer, sometimes it converges to a wrong solution called diagonal solutions. (Indeed, the denser the signal constellations the more noise sources such as "tap fluctuation noise" cause convergence problems. Tap fluctuation noise is noise introduced by the tap updating algorithm.) Therefore, and in accordance with the invention, we have discovered another technique for use in blind equalization of an adaptive equalizer that reduces the rate of occurrence of a diagonal solution. In particular, and in accordance with the invention, a receiver performs blind equalization as a finction of both the constant R and the sliced symbols $\hat{A}_n$.

The new blind equalization algorithm is called symbol constant modulus algorithm (SCMA). In SCMA, CMA is modified by adding the sliced symbols $\hat{A}_n$ to the cost functions. The cost functions of the generalized SCMA are:

$$CF_i = E[\hat{a}_n^L (|Y_n|^2 - R^2)^2]; \text{ and} \quad (17)$$

$$CF_q = E[\hat{b}_n^L (|Y_n|^2 - R^2)^2]. \quad (18)$$

Normally, L=2 is used, so that the cost functions are given as:

$$CF_i = E[\hat{a}_n^2 (|Y_n|^2 - R^2)^2]; \text{ and} \quad (19)$$

$$CF_q = E[\hat{b}_n^2 (|Y_n|^2 - R^2)^2]. \quad (20)$$

A comparison of the cost function of CMA (illustrated by equation (14)) and the cost functions of SCMA (illustrated by equations (19) and (20)) shows that CMA is a two-dimensional algorithm while SCMA is a pseudo two-dimensional algorithm. In particular, since CMA is a two-dimensional algorithm—CMA cannot rotate a constellation. However, since SCMA uses a one-dimensional symbol in each dimension (i.e., pseudo two-dimensional)—SCMA can rotate a constellation and make it correctly converge, i.e., to a straight constellation. Further, CMA only requires the use of one cost function while SCMA uses two cost functions.

A comparison of the cost function of MMA (illustrated by equations (15) and (16)) and the cost functions of SCMA shows that SCMA has properties similar to MMA since both of them can make an equalizer converge to a straight constellation. However, since SCMA adds the sliced symbols, $\hat{A}_n$ to the CMA cost function, SCMA uses higher statistics than both CMA and MMA.

The filter tap updating algorithms for SCMA are derived from the cost functions (equations (19) and (20)). They are:

$$c_{n+1} = c_n - \mu \hat{a}_n^2 y_n (|Y_n|^2 - R^2) r_n; \text{ and} \quad (<)$$

$$d_{n+1}32\ d_n - \mu \hat{b}_n^2 \tilde{y}_n (|Y_n|^2 - R^2) r_n; \quad (22)$$

where the constant R is computed as:

$$R^2 = \frac{E[\hat{a}_n^6] + E^3[\hat{a}_n^2]}{E[\hat{a}_n^4]}. \quad (23)$$

It should be noted that for 16-CAP (described below), R=3.45.

Figure 4:
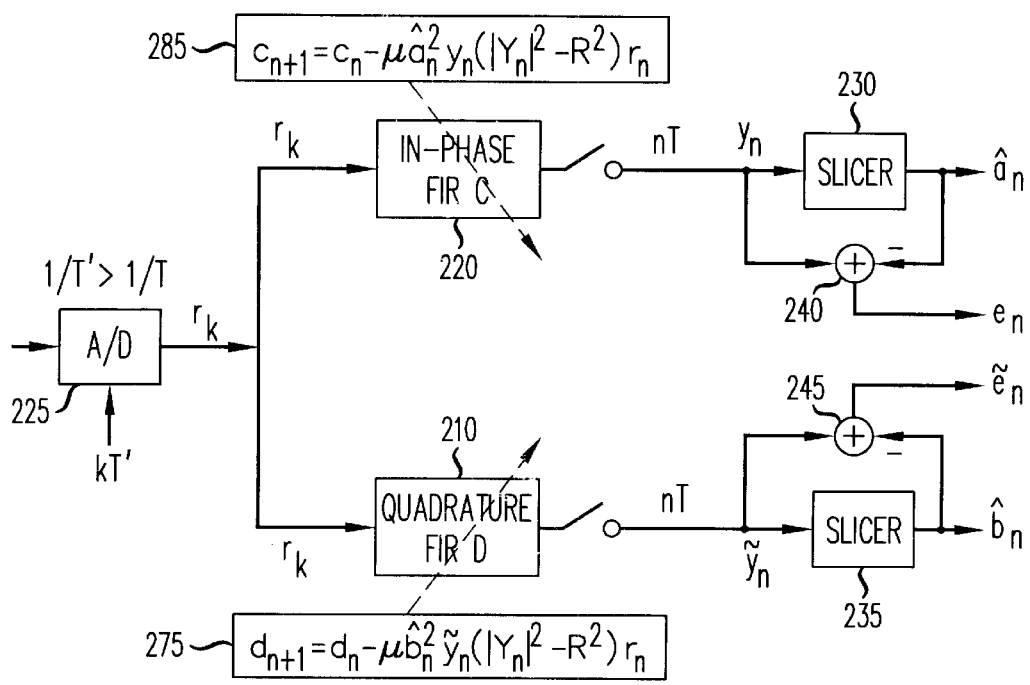
FIG. 4 shows an illustrative block diagram of a phase-splitting equalizer in accordance with the principles of the invention.

An illustrative block diagram of a phase-splitting equalizer in accordance with the principles of the invention is shown in FIG. 4. Except for the inventive concept, FIG. 4 is similar to FIG. 2 (described above) and as such will not be further described. As can be seen in FIG. 4, tap updating elements 275 and 285 (which represent equations (22) and (21)) update the coefficients of filters 210 and 220, respectively (as represented by the dashed arrows). The tap updating algorithms of equations (21) and (22) both use an error correction term, or step size, $\mu$, which is best determined by simulation.

Illustrative embodiments of the inventive concept are shown in FIGS. 5 and 6 for use in receiver 10 of FIG. 1. FIG. 5 illustrates an embodiment representative of a digital signal processor 400 that is programmed to implement an FSLE in accordance with the principles of the invention. Digital signal processor 400 comprises a central processing unit (processor) 405 and memory 410. A portion of memory 410 is used to store program instructions that, when executed by processor 405, implement the SCMA algorithm. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide a output signal 406. For the purposes of example only, it is assumed that output signal 406 represents a sequence of sliced symbols. (As known in the art, a digital signal processor may, additionally, further process received signal 404 before deriving output signal 406.) An illustrative software program is not described herein since, after learning of the SCMA algorithm as described herein, such a program is within the capability of one skilled in the art. Also, it should be noted that any equalizer structures, such as that described earlier, can be implemented by digital signal processor 400 in accordance with the inventive concept.

FIG. 6 illustrates another alternative embodiment of the inventive concept. Circuitry 500 comprises a central processing unit (processor) 505, and an equalizer 510. The latter is illustratively assumed to be a phase-splitting FSLE as described above. It is assumed that equalizer 510 includes at least one tap-coefficient register for storing values for corresponding tap coefficient vectors (e.g., as shown in FIG. 3). Processor 505 includes memory, not shown, similar to memory 410 of FIG. 5 for implementing the SCMA algorithm. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution. It is assumed the processor 505 generates the above-mentioned sliced symbols from the equalizer output signal. (Alternatively, equalizer 510 may include an associated slicer, in which case equalizer output signal 511 represents the sliced symbols.)

A blind start-up procedure in accordance with the principles of the invention for use in receiver 10 of FIG. 1 is shown in FIG. 7. In step 605, receiver 10 uses the SCMA cost function with its corresponding tap updating algorithms to begin blind convergence of an equalizer, e.g., equalizer 510 of FIG. 6. In step 610, a decision is made whether to switch from the SCMA algorithm to the LMS adaptation algorithm or to continue using the SCMA algorithm to converge the equalizer. Typically, this is referred to in the art as determining if the eye is open enough (as noted above) and if the originally tilted constellation has been derotated to a straight constellation. Step 610 of the blind start-up procedure can be schedule-driven, event-driven, or both. With a schedule-driven approach, the switch between two different tap updating algorithms occurs after some fixed number, M, of iterations (which can be determined by a counter, for example). This approach presumes a certain amount of eye-opening after M iterations. With an event-driven approach, the switch occurs when a certain quality of eye opening is achieved. This can be done, for example, by continuously monitoring the MSE and making the switch when the MSE is below some threshold T. If the eye has been opened enough and the constellation has been adequately rotated (e.g., within a predetermined value), receiver 10 switches to the LMS Adaptation algorithm in step 615.

Application to Other Blind Equalization Algorithms

The inventive concept, i.e., the combined use of the constant R and the sliced symbols, $\hat{A}_n$, can also be applied to other commonly used blind equalization algorithms, such as MMA and RCA and can also improve the convergence rate.

When the sliced symbols, $\hat{a}_n$ and $\hat{b}_n$ are applied to MMA, the cost functions for the resulting symbol MMA (SMMA) algorithm are:

$$CF_i = E[\hat{a}_n^2(y_n^2 - R^2)^2]; \text{ and} \qquad (24)$$

$$CF_q = E[\hat{b}_n^2(\tilde{y}_n^2 - R^2)^2]. \qquad (25)$$

The tap coefficients are updated according to:

$$c_{n+1} = c_n - \mu \hat{a}_n^2 y_n(y_n^2 - R^2)r_n; \text{ and} \qquad (26)$$

$$d_{n+1} = d_n - \mu \hat{b}_n^2 \tilde{y}_n(\tilde{y}_n^2 - R^2)r_n. \qquad (27)$$

With a properly chosen step size, SCMA makes the equalizer converge faster than standard MMA.

When the sliced symbols, $\hat{A}_n$, are applied to RCA, The cost functions for the resulting symbol RCA (SRCA) algorithm are:

$$CF_i = E[\hat{a}_n^2(y_n - Rsgn(y_n))^2]; \text{ and} \qquad (28)$$

$$CF_q = E[\hat{b}_n^2(\tilde{y}_n - Rsgn(\tilde{y}_n))^2]. \qquad (29)$$

The tap coefficients are updated as follows:

$$c_{n+1} = c_n - \mu \hat{a}_n^2(y_n - Rsgn(y_n))r_n; \text{ and} \qquad (30)$$

$$d_{n+1} = d_n - \mu \hat{b}_n^2(\tilde{y}_n - Rsgn(\tilde{y}_n))r_n. \qquad (31)$$

As is the case for MMA, the symbols $A_n^2$ makes the equalizer converge faster than standard RCA.

As noted earlier, modifications of the above-described embodiments shown in FIGS. 4–7 for use with other blind equalization algorithms in accordance with the inventive concept are straightforward and will not be described herein.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., FIR 210, etc., the functions of any one or more of those building blocks can be carried out using one or more appropriately programmed processors or processing circuitry, e.g., a digital signal processor; discrete circuit elements; integrated circuits; etc.

What is claimed:

1. A method for use in a communications receiver, the method comprising the steps of:

slicing a signal to provide an output signal representing sliced symbols; and blindly converging at least one of N tap coefficient vectors of an adaptive filter using at least one cost function that is a function of both a constant R and the sliced symbols.

2. The method of claim 1 wherein a value of the constant R is statistically related to the sliced symbols.

3. The method of claim 1 wherein the blindly converging step includes the step of using a modified form of a constant modulus based algorithm to adapt one of the tap coefficient vectors as a function of the constant R and the sliced symbols.

4. The method of claim 3 wherein the modified form is symbol CMA (SCMA) and the at least one cost function comprises:

an in-phase cost function $CF_i$ given by:

$$CF_i = E[\hat{a}_n^L(|Y_n|^2 - R^2)^2]$$

and a quadrature cost fuction $CF_q$ given by:

$$CF_q = E[\hat{b}_n^L(|Y_n|^2 - R^2)^2]$$

where:

$\hat{a}_n$ and $\hat{b}_n$ are in-phase and quadrature components, respectively, of the sliced symbols;

$Y_n$ is a complex output signal generated by the adaptive filter; and $E[.]$ denotes expectation.

5. The method of claim 4 wherein the modified form is constant rotation symbol CMA (CR-SCMA).

6. The method of claim 1 wherein the blindly converging step includes the step of using a modified form of a multi-modulus based algorithm to adapt one of the tap coefficient vectors as a function of the constant R and the sliced symbols.

7. The method of claim 6 wherein the modified form is symbol MMA (SMMA) and the at least one cost function comprises:

an in-phase cost function $CF_i$ given by:

$$CF_i = E[\hat{a}_n^L(y_n^2 - R^2)^2]$$

and a quadrature cost function $CF_q$ given by:

$$CF_q = E[\hat{b}_n^L(\tilde{y}_n^2 - R^2)^2]$$

where:

$\hat{a}_n$ and $\hat{b}_n$ are in-phase and quadrature components, respectively, of the sliced symbols;

$y_n$ and $\tilde{y}_n$ are in-phase and quadrature components, respectively, of a complex output signal generated by the adaptive filter; and $E[.]$ denotes expectation.

8. The method of claim 1 wherein the blindly converging step includes the step of using a modified form of a reduced constellation based algorithm to adapt one of the tap coefficient vectors as a function of the constant R and the sliced symbols.

9. The method of claim 8 wherein the modified form is symbol RCA (SRCA) and the at least one cost function comprises:

an in-phase cost fuction $CF_i$ given by:

$$CF_i = E[\hat{a}_n^L(y_n - R\, sgn(y_n))^2]$$

and a quadrature cost function $CF_q$ given by:

$$CF_q = E[\hat{b}_n^L(\tilde{y}_n - R\, sgn(\tilde{y}_n))^2]$$

where:
$\hat{a}_n$ and $\hat{b}_n$ are in-phase and quadrature components, respectively, of the sliced symbols;
$y_n$ and $\tilde{y}_n$ are in-phase and quadrature components, respectively, of a complex output signal generated by the adaptive filter; and
$E[.]$ denotes expectation.

10. The method of claim 1 wherein the adaptive filter is a phase-splitting equalizer.

11. The method of claim 1 further comprising the step of switching to a least mean square based adaptation algorithm after the blindly converging step.

12. The method of claim 11 wherein the blindly converging step is performed until a calculated error rate of a received signal is reached, upon which the switching step is performed.

13. The method of claim 11 wherein the blindly converging step is performed until a predetermined amount of time passes, upon which the switching step is performed.

14. Apparatus for use in a receiver, the apparatus comprising:

an adaptive filter having associated N tap coefficient vectors;
a slicer for providing sliced symbols; and
circuitry for adapting at least one of the N tap coefficient vectors using at least one cost function that is a function of both a constant R and the sliced symbols.

15. The apparatus of claim 14 wherein a value of the constant R is statistically related to the sliced symbols.

16. The apparatus of claim 14 wherein the circuitry uses a modified form of a constant modulus based algorithm to adapt one of the tap coefficient vectors as a function of the constant R and the sliced symbols.

17. The apparatus of claim 16 wherein the modified form is symbol CMA (SCMA) and the at least one cost function comprises:

an in-phase cost function $CF_i$ given by:

$$CF_i = E[\hat{a}_n^L(|Y_n|^2 - R^2)^2]$$

and a quadrature cost function $CF_q$ given by:

$$CF_q = E[\hat{b}_n^L(|Y_n|^2 - R^2)^2]$$

where:
$\hat{a}_n$ and $\hat{b}_n$ are in-phase and quadrature components, respectively, of the sliced symbols;
$Y_n$ is a complex output signal generated by the adaptive filter; and
$E[.]$ denotes expectation.

18. The apparatus of claim 16 wherein the modified form is constant rotation symbol CMA (CR-SCMA).

19. The apparatus of claim 14 wherein the circuitry uses a modified form of a multimodulus based algorithm to adapt one of the tap coefficient vectors as a function of the constant R and the sliced symbols.

20. The apparatus of claim 19 wherein the modified form is symbol MMA (SMMA) and the at least one cost function comprises:

an in-phase cost function $CF_i$ given by:

$$CF_i = E[\hat{a}_n^L(y_n^2 - R^2)^2]$$

and a quadrature cost function $CF_q$ given by:

$$CF_q = E[\hat{b}_n^L(\tilde{y}_n^2 - R^2)^2]$$

where:
$\hat{a}_n$ and $\hat{b}_n$ are in-phase and quadrature components, respectively, of the sliced symbols;
$y_n$ and $\tilde{y}_n$ are in-phase and quadrature components, respectively, of a complex output signal generated by the adaptive filter; and
$E[.]$ denotes expectation.

21. The apparatus of claim 14 wherein the circuitry uses a modified form of a reduced constellation based algorithm to adapt one of the tap coefficient vectors as a function of the constant R and the sliced symbols.

22. The apparatus of claim 21 wherein the modified form is symbol RCA (SRCA) and the at least one cost function comprises:

an in-phase cost function $CF_i$ given by:

$$CF_i = E[\hat{a}_n^L(y_n - R\, sgn(y_n))^2]$$

and a quadrature cost function $CF_q$ given by:

$$CF_q = E[\hat{b}_n^L(\tilde{y}_n - R\, sgn(\tilde{y}_n))^2]$$

where:
$\hat{a}_n$ and $\hat{b}_n$ are in-phase and quadrature components, respectively, of the sliced symbols;
$y_n$ and $\tilde{y}_n$ are in-phase and quadrature components, respectively, of a complex output signal generated by the adaptive filter; and
$E[.]$ denotes expectation.

23. The apparatus of claim 14 wherein the adaptive filter is a phase-splitting equalizer.

24. The apparatus of claim 14 wherein the circuitry further comprises a processor.

25. Apparatus for use in performing blind equalization in a receiver, the apparatus comprising:

a memory for storing N tap coefficient vectors; and
a processor for adapting at least one of the N tap coefficient vectors using at least one cost function that is a function of both a constant R and sliced symbol values.

26. The apparatus of claim 25 wherein a value of the constant R is statistically related to the sliced symbols.

27. The apparatus of claim 25 wherein the processor uses a modified form of a constant modulus based algorithm to adapt one of the tap coefficient vectors as a function of the constant R and the sliced symbols.

28. The apparatus of claim 27 wherein the modified form is symbol CMA (SCMA) and the at least one cost function comprises:

an in-phase cost function $CF_i$ given by:

$$CF_i = E[\hat{a}_n^L(|Y_n|^2 - R^2)^2]$$

and a quadrature cost function $CF_q$ given by:

$$CF_q = E[\hat{b}_n^L(|Y_n|^2 - R^2)^2]$$

where:
$\hat{a}_n$ and $\hat{b}_n$ are in-phase and quadrature components, respectively, of the sliced symbols;
$Y_n$ is a complex output signal generated by the adaptive filter; and
E[.] denotes expectation.

29. The apparatus of claim 27 wherein the modified form is constant rotation symbol CMA (CR-SCMA).

30. The apparatus of claim 25 wherein the processor uses a modified form of a multimodulus based algorithm to adapt one of the tap coefficient vectors as a function of the constant R and the sliced symbols.

31. The apparatus of claim 30 wherein the modified form is symbol MMA (SMMA) end the at least one cost function comprises:

an in-phase cost function $CF_i$ given by:

$$CF_i = E[\hat{a}_n^L(y_n^2 - R^2)^2]$$

and a quadrature cost function $CF_q$ given by:

$$CF_q = E[\hat{b}_n^L(\tilde{y}_n^2 - R^2)^2]$$

where:
$\hat{a}_n$ and $\hat{b}_n$ are in-phase and quadrature components, respectively, of the sliced symbols;
$y_n$ and $\tilde{y}_n$ are in-phase and quadrature components, respectively, of a complex output signal generated by the adaptive filter; and
E[.] denotes expectation.

32. The apparatus of claim 25 wherein the processor uses a modified form of a reduced constellation based algorithm to adapt one of the tap coefficient vectors as a function of the constant R and the sliced symbols.

33. The apparatus of claim 32 wherein the modified form is symbol RCA (SRCA) and the at least one cost function comprises:

an in-phase cost function $CF_i$ given by:

$$CF_i = E[\hat{a}_n^L(y_n - R\, sgn(y_n))^2]$$

and a quadrature cost function $CF_q$ given by:

$$CF_q = E[\hat{b}_n^L(\tilde{y}_n - R\, sgn(\tilde{y}_n))^2]$$

where:
$\hat{a}_n$ and $\hat{b}_n$ are in-phase and quadrature components, respectively, of the sliced symbols;
$y_n$ and $\tilde{y}_n$ are in-phase and quadrature components, respectively, of a complex output signal generated by the adaptive filter; and
E[.] denotes expectation.

34. The apparatus of claim 25 wherein the adaptive filter is a phase splitting equalizer.

* * * * *